United States Patent
Lee et al.

(10) Patent No.: US 10,732,977 B2
(45) Date of Patent: Aug. 4, 2020

(54) BYTECODE PROCESSING DEVICE AND OPERATION METHOD THEREOF

(71) Applicant: SEOUL NATIONAL UNIVERSITY R&DB FOUNDATION, Seoul (KR)

(72) Inventors: JaeWook Lee, Seoul (KR); ChanNoh Kim, Seoul (KR); SungMin Kim, Seoul (KR)

(73) Assignee: Seoul National University R&DB Foundation, Seoul (KR)

( * ) Notice: Subject to any disclaimer, the term of this patent is extended or adjusted under 35 U.S.C. 154(b) by 226 days.

(21) Appl. No.: 16/006,962

(22) Filed: Jun. 13, 2018

(65) Prior Publication Data
US 2018/0365015 A1    Dec. 20, 2018

(30) Foreign Application Priority Data
Jun. 16, 2017    (KR) .................. 10-2017-0076854

(51) Int. Cl.
*G06F 9/38*    (2018.01)
*G06F 9/455*    (2018.01)

(52) U.S. Cl.
CPC ........ *G06F 9/3806* (2013.01); *G06F 9/45516* (2013.01)

(58) Field of Classification Search
None
See application file for complete search history.

(56) References Cited

U.S. PATENT DOCUMENTS

| 5,740,418 A | 4/1998 | Hara |
| 6,119,222 A | 9/2000 | Shiell et al. |

(Continued)

FOREIGN PATENT DOCUMENTS

| JP | 3907809 B2 | 4/2007 |
| KR | 10-0329063 B1 | 3/2002 |

(Continued)

OTHER PUBLICATIONS

Kim, Channoh et al. "Short-Circuit Dispatch: Accelerating Virtual Machine Interpreters on Embedded Processors." Proceedings of 2016 43rd IEEE International Symposium on Computer Architecture, ISCA 2016, Jun. 18-22, 2016, Seoul, South Korea, pp. 291-303.

(Continued)

*Primary Examiner* — William B Partridge
(74) *Attorney, Agent, or Firm* — Harness, Dickey & Pierce, P.L.C.

(57) ABSTRACT

The bytecode processing device includes a branch target buffer including a tag field, a target address field corresponding to the tag field and an operation code bit field for representing whether a value stored in the tag field is an operation code, a bytecode fetch unit configured to fetch a bytecode including an operation code, an operation code extraction unit configured to extract the operation code from the bytecode, a branch target buffer search unit configured to perform a search to determine whether the extracted operation code exists in the tag field of the branch target buffer, and if the operation code exists in the tag field, extract a target address corresponding to the operation code from the target address field, and a bytecode execution unit configured to execute the bytecode by branching to the target address.

11 Claims, 10 Drawing Sheets

(56) References Cited

U.S. PATENT DOCUMENTS

| | | |
|---|---|---|
| 6,263,427 B1 | 7/2001 | Cummins et al. |
| 8,205,068 B2 | 6/2012 | Moyer et al. |
| 2003/0135844 A1 | 7/2003 | Yellin et al. |
| 2004/0181654 A1* | 9/2004 | Chen .................. G06F 9/30181 |
| | | 712/239 |
| 2006/0101437 A1 | 5/2006 | Lee et al. |
| 2012/0151194 A1* | 6/2012 | Sihn ....................... G06F 9/322 |
| | | 712/239 |

FOREIGN PATENT DOCUMENTS

| | | |
|---|---|---|
| KR | 10-2006-0035077 A | 4/2006 |
| KR | 10-2009-0085816 A | 8/2009 |
| KR | 10-2012-0064446 A | 6/2012 |
| WO | WO-98/019237 A1 | 5/1998 |

OTHER PUBLICATIONS

Muhammad Umar Farooq et al. "Value Based BTB Indexing for Indirect Jump Prediction". IEEE Xplore. Conference High Performance Computer Architecture (HPCA). 2010. pp. 1-13.

Erven Rohou et al. "Branch Prediction and the Performance of Interpreters—Don't Trust Folklore". IEEE. In proc. of International Symposium on Code Generation and Optimization (CGO). 2015. pp. 103-114.

* cited by examiner

FIG. 7

| P | B | V | J | Tag | Target Address | |
|---|---|---|---|---|---|---|
| P[1] | B[1] | 1 | 0 | PC | Address | ~b1 |
| P[2] | B[1] | 1 | 1 | Opcode[1] | Address[1] | ~b2 |
| P[2] | B[2] | 1 | 1 | Opcode[2] | Address[2] | ~b3 |
| ⋮ | ⋮ | ⋮ | ⋮ | ⋮ | ⋮ | |

BTB — 105a

FIG. 9

```
L1   Fetch:
L2     ld         a5, 40(s1)
L3     lw.op      s11, 0(a5)    — C1
L4     add        a4, a5, 4
L4     sd         a4, 40(s1)
L6   Branch - on - opcode:
L7     bop                      — C2
L8   Decode - and - Jump:
L9     ## decode
L10    and        a5, s11, 63
L11    ## bound check
L12    li         a3, 45
L13    bgtu       a5, a3, Default
L14    ## target address calculation and jump
L15    sll        a5, a5, 32
L16    srl        a5, a5, 32
L17    sll        a5, a5, 2
L18    add        a5, s3, a5
L19    lw         a5, 0(a5)
L20    jru        a5            — C3
```

BYTECODE PROCESSING DEVICE AND OPERATION METHOD THEREOF

CROSS-REFERENCE TO RELATED APPLICATIONS

This U.S. non-provisional patent application claims priority under 35 U.S.C. § 119 of Korean Patent Application No. 10-2017-0076854, filed on Jun. 16, 2017, the entire contents of which are hereby incorporated by reference.

BACKGROUND

The present disclosure relates to a bytecode processing device and an operation method thereof, and more particularly, to a device and a method for processing a bytecode of a program written in a programming language.

Script languages such as JavaScript, Python, MATLAB, PHP, R, and Lua are used in various fields. An interpreter-based virtual machine is widely used to execute the scripting languages. The interpreter-based virtual machine converts the script into bytecode, i.e., intermediate code, and executes the generated bytecode.

The dispatch loop of the interpreter is a loop that executes the generated bytecode, and the bytecode is processed by operations such as fetch, decode, and execute. An indirect branch may be performed to process the bytecode in the dispatch loop, and an indirect branch prediction may be performed to perform the indirect branch.

The indirect branch instruction needs accurate prediction of the target address of the indirect branch because the target address of the bytecode changes dynamically.

SUMMARY

The present disclosure provides a bytecode processing device and an operation method thereof for effectively predicting a target address of an indirect branch in a dispatch loop and shortening the processing time of repeated byte codes.

An embodiment of the inventive concept provides a bytecode processing device including: a branch target buffer including a tag field, a target address field corresponding to the tag field and an operation code bit field for representing whether a value stored in the tag field is an operation code; a bytecode fetch unit configured to fetch a bytecode including an operation code; an operation code extraction unit configured to extract the operation code from the bytecode; a branch target buffer search unit configured to perform a search to determine whether the extracted operation code exists in the tag field of the branch target buffer, and if the operation code exists in the tag field, extract a target address corresponding to the operation code from the target address field; and a bytecode execution unit configured to execute the bytecode by branching to the target address.

In an embodiment, the device may further include a mask register configured to store data including at least one bit having a bit value of 1, wherein the operation code extraction unit may extract the operation code by performing an AND operation on the data stored in the mask register and the bytecode.

In an embodiment, the device may further include: a program counter register configured to store an address of an instruction to be fetched among a plurality of instructions processed to process the bytecode; and at least one branch program counter register configured to store an address of a predetermined indirect branch instruction, wherein if the address of at least one predetermined indirect branch instruction stored in the at least one branch program counter register is identical to the address of the instruction to be fetched, the branch target buffer search unit may perform a search to determine whether the operation code exists in the tag field.

In an embodiment, the device may further include a branch target buffer update unit configured to, when the operation code does not exist in the tag field, calculate the target address by decoding the bytecode and store the calculated target address and the operation code in the branch target buffer.

In an embodiment, the branch target buffer may further include a program ID field for distinguishing a program corresponding to a value of the tag field or a value of the target address field.

In an embodiment, the branch target buffer may further include a branch ID field for distinguishing a dispatch loop corresponding to a value of the tag field or a value of the target address field.

In an embodiment, the number of buffers in the branch target buffer for storing the operation code and the target address may be less than a predetermined number.

In an embodiment of the inventive concept, provided is an operation method of a bytecode processing device including a branch target buffer including a tag field, a target address field corresponding to the tag field and an operation code bit field for representing whether a value stored in the tag field is an operation code. The method includes: fetching a bytecode including an operation code; extracting the operation code from the bytecode; performing a search to determine whether the extracted operation code exists in the tag field of the branch target buffer; extracting a target address corresponding to the operation code from the target address field if the operation code exists in the tag field; and executing the bytecode by branching to the target address.

In an embodiment, the extracting of the operation code may include extracting the operation code by performing an AND operation on data including at least one bit having a bit value of 1 and the byte code.

In an embodiment, the searching of the branch target buffer may include: determining whether an address of an instruction to be fetched among a plurality of instructions processed to process the bytecode is identical to an address of at least one predetermined indirect branch instruction; and if the address of the instruction to be fetched is identical to the address of at least one predetermined indirect branch instruction, searching the tag field by using the operation code.

In an embodiment, the method may further include, if the operation code does not exist in the tag field, calculating the target address by decoding the bytecode; and storing the calculated target address and the operation code in the branch target buffer.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings:

FIG. 7 is a view illustrating another example of a branch target buffer according to an embodiment of the inventive concept;

FIG. 9 is a diagram showing an example of implementing a bytecode processing method with an alpha assembly code according to an embodiment of the inventive concept.

DETAILED DESCRIPTION

In the following, embodiments of the inventive concept will be described in detail so that those skilled in the art easily carry out the inventive concept.

Figure 1:
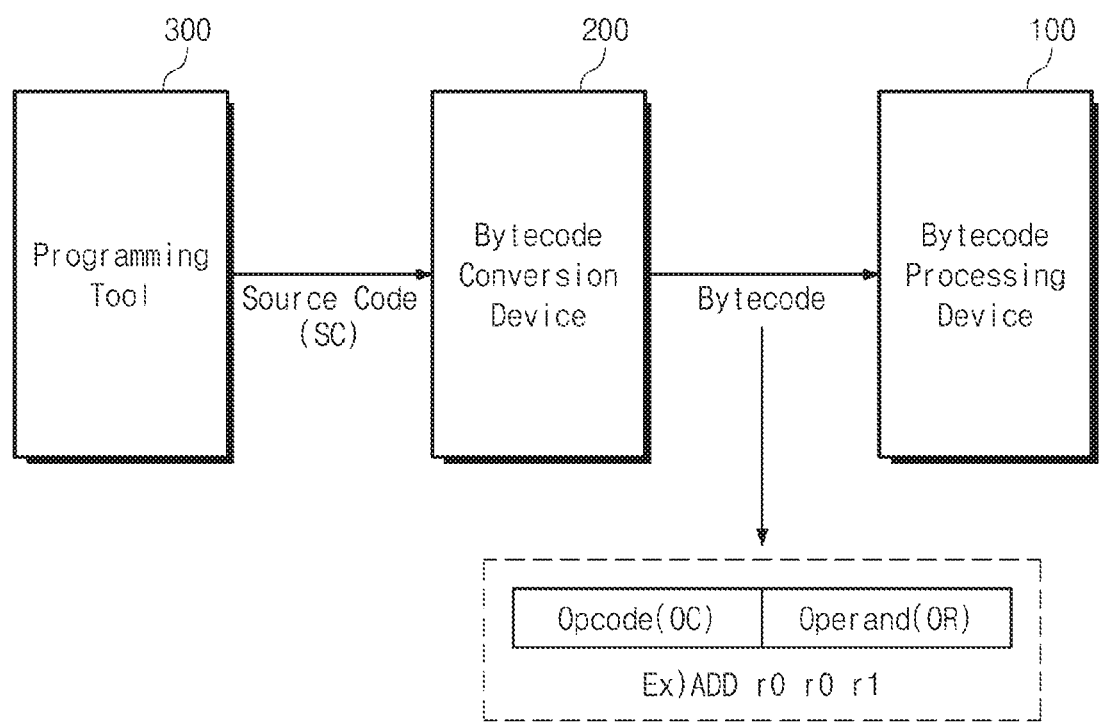
FIG. 1 is a schematic view of a bytecode processing device according to an embodiment of the inventive concept.

FIG. 1 is a schematic view of a bytecode processing device according to an embodiment of the inventive concept. The bytecode processing device 100 fetches, decodes, and executes bytecode. The bytecode may be code for converting source code (SC) written in various kinds of programming languages by a programming tool 300 into a machine language that may be directly processed in a computer.

In an embodiment, the bytecode may be a code generated from a bytecode conversion device 200. For example, the source code (SC) written in JavaScript may be converted to bytecode by an interpreter and processed inside a computer. Alternatively, the source code (SC) written in advanced programming languages such as Lua, MATLAB, Python, and Java may be converted to bytecode through a compiler or an interpreter.

As shown in FIG. 1, the bytecode may include an opcode (OC; operation code) and an operand (OR). The opcode is a code for indicating the type of operation in a computer, and the operand (OR) includes data or information to be operated. That is, the opcode may mean a code of a type capable of performing a corresponding operation using data or information of the operand (OR).

For example, the byte code of "ADD r0 r0 r1" may be distinguished by the opcode of "ADD" and the operand (OR) of "r0 r0 r1". "ADD" may represent an addition operation, and "r0 r0 r1" may represent information of the operand (OR) that becomes the target of the addition operation. The bytecode of "ADD r0 r0 r1" indicates an operation to add the value of the "r0" register and the value of the "r1" register and to store the addition result in the "r0" register.

Thus, the bytecode processed by the bytecode processing device 100 according to the embodiment of the inventive concept includes all codes of the form including the opcode and the operand (OR). In addition, the bytecode processed by the bytecode processing device 100 according to an embodiment of the inventive concept includes all the codes programmed in the form including the opcode and the operand (OR) by the programming tool 300 in addition to the code converted from the source code (SC).

The bytecode processing device 100 may process a plurality of instructions recognized by machine such as a computer to process one bytecode. That is, the bytecode processing device 100 may perform a series of operations for processing one bytecode through processing of a plurality of instructions.

In the specification, an instruction refers to a machine language that may be recognized and executed by a device such as a computer (e.g., the bytecode processing device 100 of FIG. 1) to process the bytecode. Since the bytecode has a form different from an instruction that may be directly recognized and executed by a device such as a computer, if the bytecode is processed in the device, the bytecode may be processed through a plurality of instructions.

One or more of the plurality of instructions for processing the bytecode may be an indirect branch instruction. The indirect branch instruction is an instruction whose target address changes dynamically. The target address is the address of an instruction that should branch to perform the operation represented by the opcode of the bytecode. If an indirect branch instruction is executed among a plurality of instructions for processing the bytecode, the processing order of the instructions may be changed. A plurality of instructions are processed according to a sequential increase of a Program Counter (PC) indicating an address where an instruction is stored, and a target address may be branched as the PC varies, which is sequentially increased by execution of an indirect branch instruction.

Also, the target address of the indirect branch instruction may be changed according to the type of the opcode. In an embodiment, the bytecode processing device 100 may branch to different addresses to process the bytecode according to the type of the opcode. The target address of the indirect branch instruction may be calculated by determining the type of the opcode through decoding of the bytecode. For example, through decode of the "ADD r0 r0 r1" bytecode, the target address to be branched for processing an addition operation may be calculated. Thus, if the bytecode includes the same opcode, the same target address may be calculated.

The bytecode processing device 100 according to an embodiment of the inventive concept may predict the target address required in the processing process of the bytecode including the same opcode by previously storing the target address of the bytecode. Hereinafter, the bytecode processing device 100 according to an embodiment of the inventive concept will be described in detail with reference to FIGS. 2 to 5.

Figure 2:
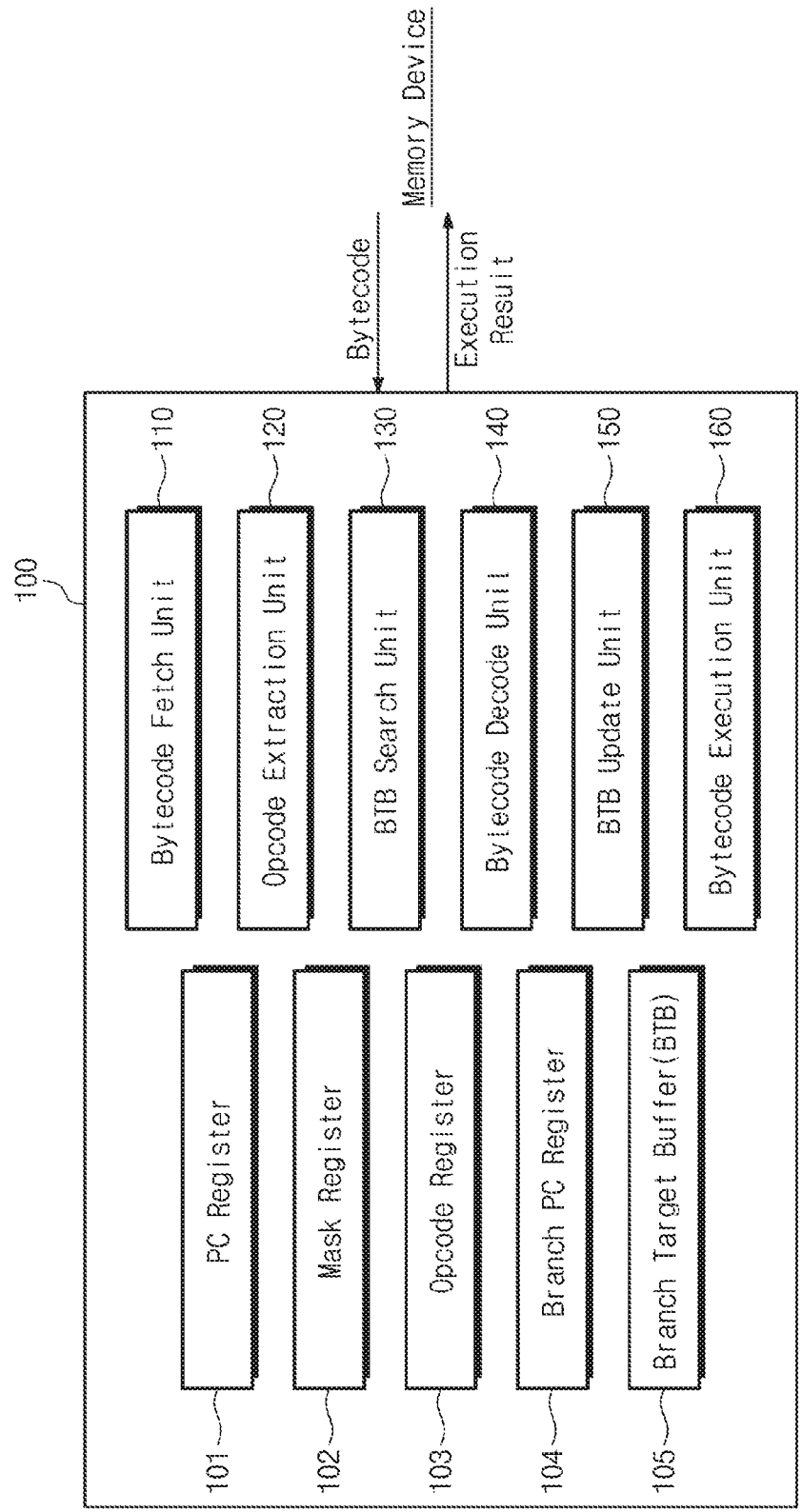
FIG. 2 is a block diagram of a bytecode processing device according to an embodiment of the inventive concept.
Figure 3:
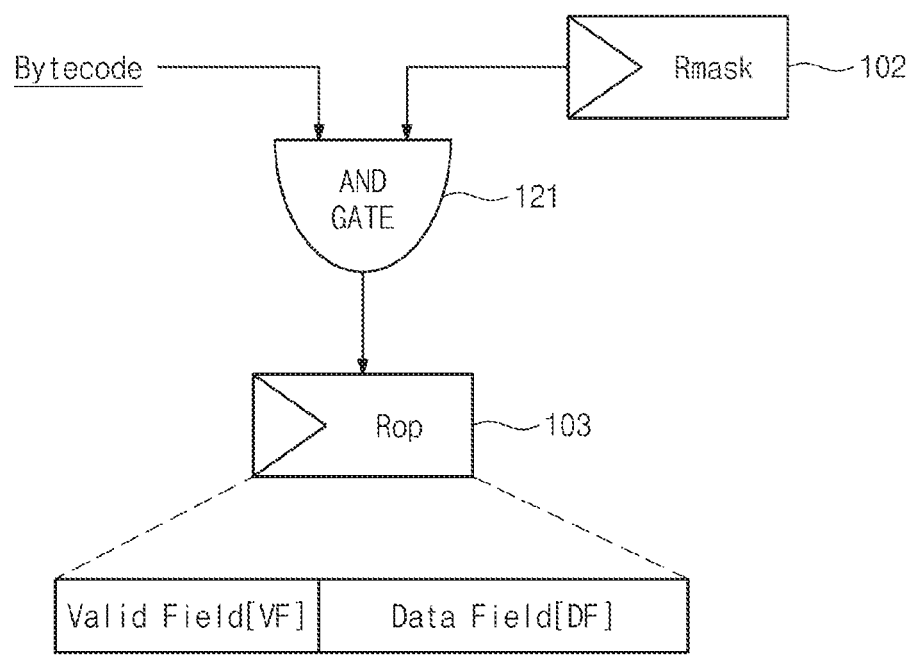
FIG. 3 is a diagram illustrating an example of an operation code extraction unit included in the bytecode processing device of FIG. 2.
Figure 4:
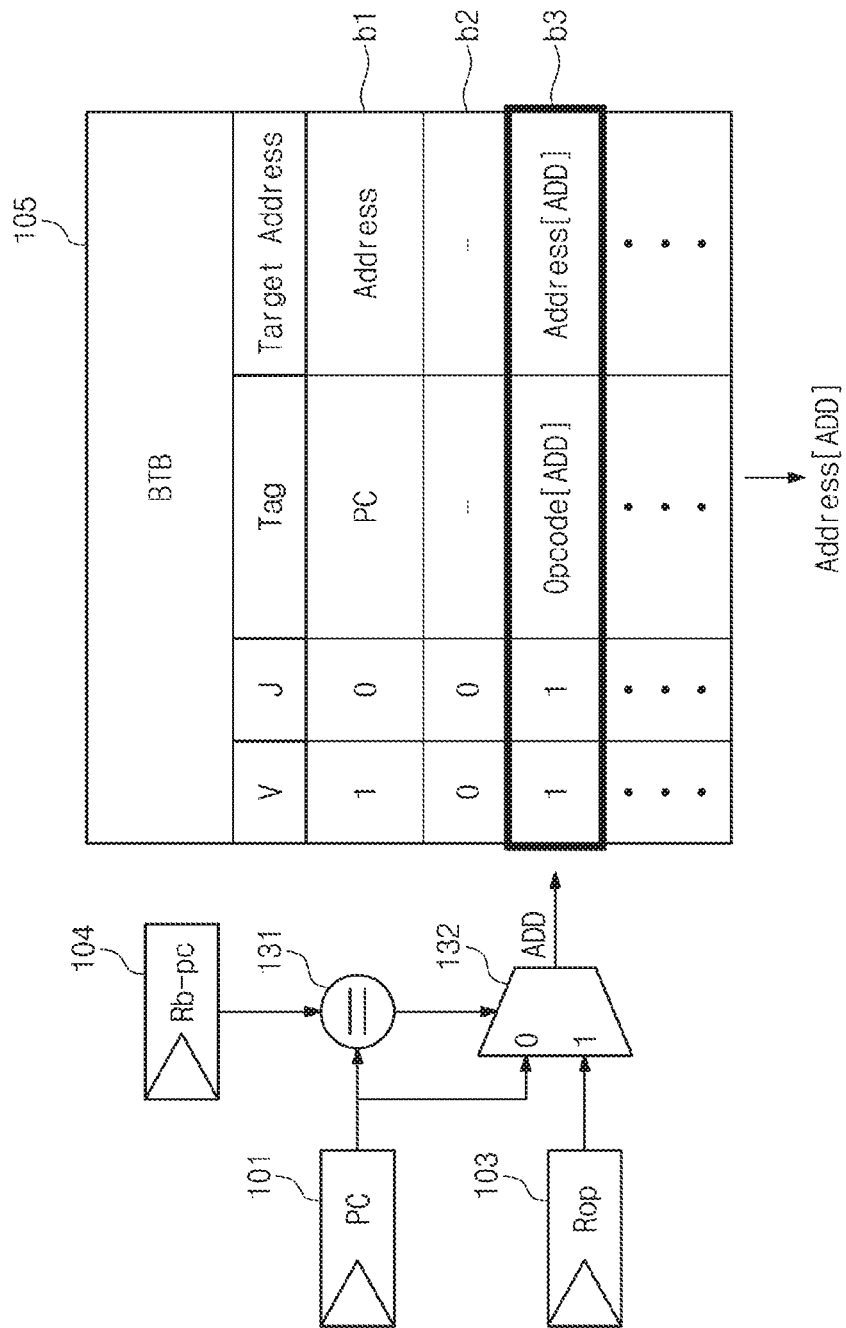
FIG. 4 is a diagram illustrating an example of a branch target buffer search unit included in the bytecode processing device of FIG. 2.
Figure 5:
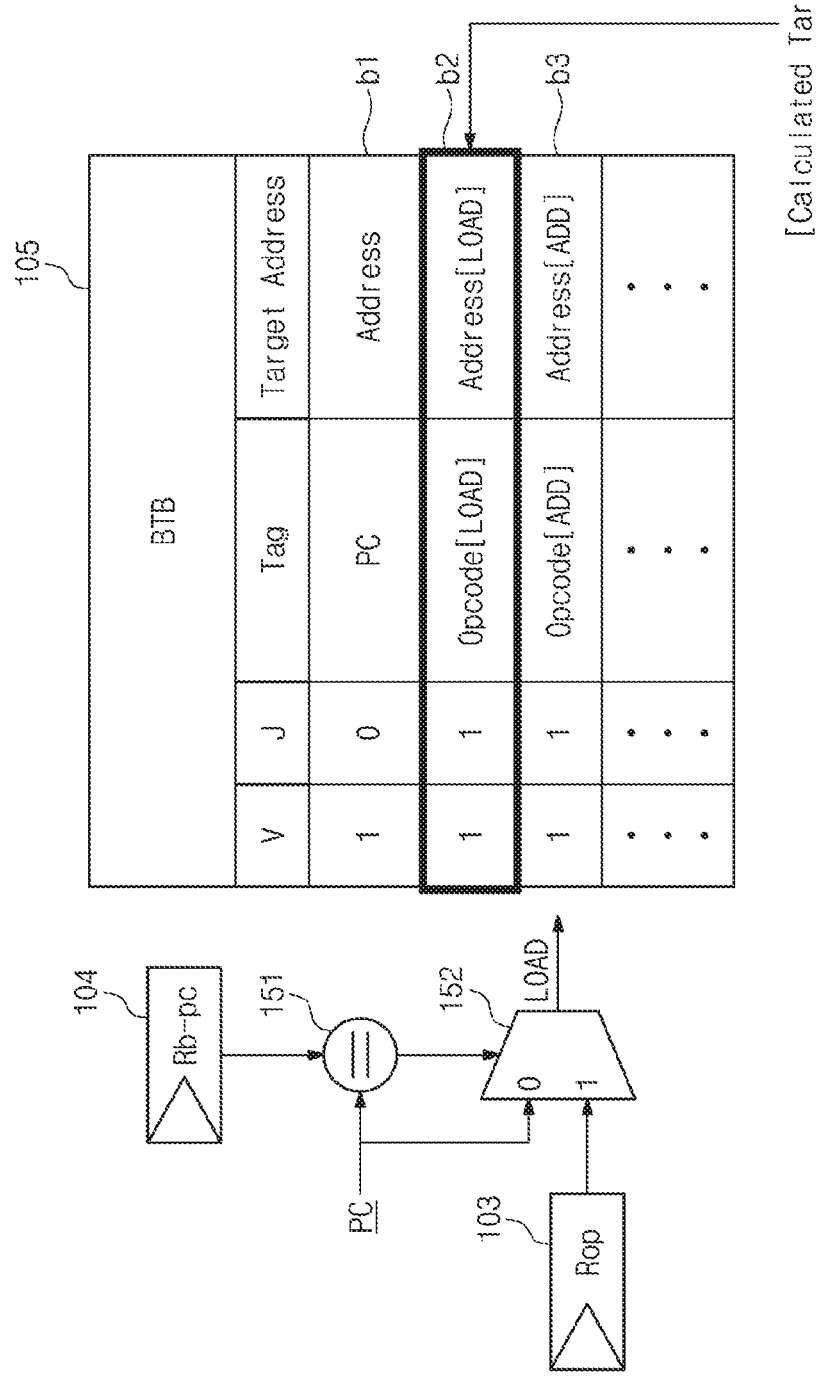
FIG. 5 is a diagram illustrating an example of a branch target buffer update unit included in the bytecode processing device of FIG. 2.

FIG. 2 is a block diagram of a bytecode processing device according to an embodiment of the inventive concept. FIG. 3 is a diagram illustrating an example of an opcode extraction unit included in the bytecode processing device of FIG. 2. FIG. 4 is a diagram illustrating an example of a Branch Target Buffer (BTB) search unit included in the bytecode processing device of FIG. 2. FIG. 5 is a diagram illustrating an example of a BTB update unit included in the bytecode processing device of FIG. 2.

The bytecode processing device 100 includes a PC register 101, a mask register 102, an opcode register 103, a branch PC register 104, a BTB 105, a bytecode fetch unit 110, an opcode extraction unit 120, a BTB search unit 130, a bytecode decode unit 140, a BTB update unit 150, and a bytecode execution unit 160.

The bytecode fetch unit 110 fetches the bytecode to be processed from the external storage device. The bytecode fetch unit 110 may fetch the bytecode from the execute result of any instruction. For example, the bytecode fetch unit 110 may fetch the bytecode from an execution result of an operation instruction or a memory access instruction.

The opcode extraction unit 120 extracts the opcode of the fetched byte code. The opcode extraction unit 120 may extract the opcode of the bytecode and store it in the opcode register 103. The opcode extraction unit 120 may extract the opcode based on the opcode length of the bytecode. For example, when the opcode length of the bytecode is 32 bits, the opcode extraction unit 120 may extract the data bits from the first bit to the 32nd bit of the bytecode as an opcode.

The opcode extraction unit 120 may extract an opcode using the data stored in the mask register 102. The data of the mask register 102 may include a plurality of bits having a value of "1". The number of bits having a value of "1" may be determined based on a predetermined number set in the bytecode processing device 100. For example, when the operation of the bytecode processing device 100 is started, the bytecode processing device 100 may store the data including a bit having a value of "1" in the mask register 102 based on a predetermined number. In an embodiment, the predetermined number may be equal to the opcode length of the extracted bytecode.

Referring to FIGS. 2 and 3, when an example of the opcode extraction unit 120 is described, the opcode extraction unit 120 may include an AND logic circuit 121. The opcode extraction unit 120 may extract the opcode from the bytecode using the mask register 102 and the AND logic circuit 121. For example, the opcode extraction unit 120 may extract the opcode by performing an AND operation of the mask register 102 with the fetched bytecode. The opcode extraction unit 120 may perform an AND operation of at least one bit of the fetched bytecode and at least one bit of the mask register 102 to extract at least one opcode bit. The extracted opcode may be stored in the opcode register 103.

For example, when the mask register 102 is "32" bits and the predetermined number is "16", "16" bits of the "32" bits of the mask register 102 may be "1". In this case, in relation to the "32" bits of the mask register 102, an AND operation with the "32" bits of the fetched bytecode may be performed to extract valid "16" bits of the "32" bits. That is, the valid "16" bits of the bytecode may be extracted as an opcode. In addition, when the mask register 102 is "32" bits and the predetermined number is "n", "n" bits of the "32" bits of the mask register 102 may be "1". Accordingly, "n" bits of the fetched bytecode may be extracted as an opcode.

The opcode register 103 may include a data field DF for storing an opcode and a valid field VF for indicating whether the opcode (OC) is valid. The result value of AND operation of the fetched bytecode and the mask register 102 may be stored in the data field DF. The valid field VF may include at least one bit. The bytecode processing device 100 may determine whether to use the opcode from the valid field VF of the opcode register 103. For example, if the opcode is not yet extracted, the value of the valid field of the opcode register 103 may be "0".

The BTB search unit 130 performs search to determine whether the extracted opcode exists in the BTB 105. Alternatively, the BTB search unit 130 may perform a search to determine whether the PC of the PC register 101 exists in the BTB 105. The PC register 101 stores the PC of the instruction to be processed in the processing process of the bytecode.

The BTB search unit 130 may perform a search to determine whether the extracted opcode exists in the BTB 105 when the instruction to be processed in the processing process of the bytecode is a predetermined instruction. For example, the predetermined instruction may be an indirect branch instruction of a plurality of instructions for processing the bytecode.

The BTB search unit 130 may search for the extracted opcode and the target address using the opcode as a tag value. Alternatively, the BTB search unit 130 may perform a search on the BTB 105 using the PC as a tag value. The BTB search unit 130 may extract a target address stored in the BTB 105 in correspondence to the opcode or PC when the extracted opcode or PC is found in the BTB 105.

Referring to FIGS. 2 and 4, the BTB 105 may include a valid bit field V, an opcode bit field J, a tag field Tag, and a target address field Target Address. The valid bit field V includes a bit value indicating whether a tag value or a target address value stored in correspondence to the tag value is valid. For example, in the case that the valid bit field V is "0", the tag value or the target address value is not valid and in the case that the valid bit field V is "1", the tag value and the target address value may be valid.

The opcode bit field J includes a bit value indicating whether the value stored in the tag field Tag is an opcode. For example, when the value of the opcode bit field J is "1", the value stored in the tag field Tag is an opcode or a part of the opcode, and when the value of the opcode bit field J is "0", the value stored in the tag field Tag may be a PC or a part of the PC.

The Tag field Tag includes a tag value for performing a search on the BTB 105. The value stored in the tag field Tag may be a PC or an opcode. For example, a PC stored in the tag field Tag may be a part of the PC. The target address field Target Address includes a target address corresponding to the tag value. The target address extracted through the BTB 105 may be a prediction value of the target address for performing the operation of the bytecode.

For example, if valid data is stored in the tag field Tag and the target address field Target Address, and the tag value is a PC, as shown in a first buffer b1, the bit value of the valid bit field V may be "1" and the bit value of the opcode bit field J may be "0". For example, if valid data is not stored in the tag field Tag and the target address field Target Address, as shown in a second buffer b2, the bit value of the valid bit field V may be "0" and the bit value of the opcode bit field J may be "0". In addition, if valid data is stored in the tag field Tag and the target address field Target Address, and the tag value is an opcode, as shown in a third buffer b3, the bit value of the valid bit field V may be "1" and the bit value of the opcode bit field J may be "1".

In the BTB 105, the target address corresponding to the opcode is a prediction value of the address for performing the operation of the opcode. If the opcodes (OCs) of different bytecodes are identical to each other, the target addresses for performing operations of different bytecodes may be the same. Therefore, when the target address stored in the BTB 105 is used as the prediction target address, the bytecode processing device 100 does not need to calculate the target address for performing the operation of the bytecode.

The target address corresponding to the PC in the BTB 105 is the prediction value of the target address for processing an instruction corresponding to the PC. For example, if the bytecode processing device 100 executes a plurality of instructions to process the bytecodes, the PC stored in the BTB 105 may be a PC of one indirect branch instruction of the plurality of instructions. In addition, the target address stored in the BTB 105 may be a prediction value of a target address for processing an indirect branch instruction.

The BTB search unit 130 may previously store the PC of one indirect branch instruction among the plurality of instructions for processing the bytecode. The BTB search unit 130 compares the PC of an instruction to be processed currently and the PC of a previously stored indirect branch instruction among a plurality of instructions for processing the bytecode and selects either an opcode or a PC as a tag value according to the comparison result. Referring to FIG. 4, the BTB search unit 130 may store the PC of the indirect branch instruction in the branch PC register 104. The BTB search unit 130 may compare the PC for fetching an instruction to be processed with the PC of a previously stored indirect branch instruction to determine whether the instruction to be processed is a previously stored indirect branch instruction. If the PC of the instruction to be processed and the PC of the previously stored indirect branch instruction are the same, the fetched instruction is a previously stored indirect branch instruction, and if the PC of the instruction to be processed and the PC of the previously stored indirect branch instruction are different, the fetched instruction is not a previously stored indirect branch instruction. If the fetched instruction is a previously stored indirect branch instruction, the BTB search unit 130 may search the BTB 105 using the opcode of the instruction. If the fetched instruction is not a previously stored indirect branch instruction, the BTB search unit 130 may search the BTB 105 using the PC of the instruction.

In an embodiment, as shown in FIG. 4, the BTB search unit 130 may include a comparator 131 and a multiplexer 132. The comparator 131 may determine whether the PC of the indirect branch instruction stored in the branch PC register 104 and the PC of the instruction stored in the PC register 101 are the same. The PC register 101 stores the PC of an instruction to be currently processed (or fetched) among a plurality of instructions to be processed in order for processing the bytecode. That is, in relation to the PC register 101, the PC of an instruction to be currently processed (or fetched) is stored, and the bytecode processing device 100 sequentially processes the plurality of instructions based on the PC of the PC register 101.

If the PC of the indirect branch instruction and the PC of the instruction to be processed are the same, an opcode is outputted as the output value of the multiplexer 132. The BTB search unit 130 may use the outputted opcode as a tag value to search for the existence of the opcode in the tag field Tag and to extract a target address corresponding to the found tag field Tag. If the PC of the indirect branch instruction and the PC of the instruction to be processed are different from each other, a PC is outputted as the output value of the multiplexer 132. The BTB search unit 130 may use the outputted PC as a tag value to search for the existence of the PC in the tag field Tag and to extract a target address corresponding to the found tag field Tag.

For example, when the PC of the branch PC register 104 and the PC of the PC register 101 are the same, the multiplexer 132 may output the opcode corresponding to the addition (ADD). The BTB search unit 130 may search for the opcode (e.g., opcode[ADD] stored in the third buffer b3) stored in the BTB 105 using the opcode corresponding to the ADD as a tag value. The BTB search unit 130 may extract a target address (e.g., address[ADD]) corresponding to the opcode (e.g., opcode[ADD]) from the BTB 105.

Although one branch PC register 104 is shown in FIG. 4, the inventive concept is not limited thereto, and the bytecode processing device 100 according to an embodiment of the inventive concept may include a plurality of branch PC registers 104. If there are a plurality of branch PC registers 104, the PC of the instruction to be processed may be compared with the PCs stored in the plurality of branch PC registers 104. If one of the PCs stored in the plurality of branch PC registers 104 is identical to the PC of the instruction to be processed, the BTB search unit 130 may search for the BTB 105 using the opcode as a tag value. The PCs of the plurality of branch PC registers 104 may be the PCs of previously stored indirect branch instructions, respectively.

If the same tag value does not exist in the BTB 105, the bytecode decode unit 140 decodes the bytecode to calculate the target address. The bytecode decode unit 140 may determine whether the opcode is a valid opcode by decoding the opcode and operand (OR) of the bytecode. If the opcode is valid, the bytecode decode unit 140 may calculate the target address on which the bytecode operation is to be performed.

According to an embodiment of the inventive concept, the bytecode decode unit 140 may be included in the bytecode processing device 100 to perform bytecode decode and target address calculation.

If the same tag value does not exist in the BTB 105 based on a search result of the BTB search unit 130, the BTB update unit 150 updates the BTB 105 using the calculated target address. The BTB update unit 150 may update the BTB 105 using the target address calculated from the bytecode decode unit 140. The BTB update unit 150 may match the extracted opcode and the calculated target address to store it in the BTB 105 or may match the PC and the calculated target address to store it in the BTB 105.

The BTB update unit 150 may determine whether the calculated target address is matched with the opcode to store it or matched with the PC to store it based on the instruction. In an embodiment, if the fetched instruction is a predetermined instruction, the calculated target address may be stored in correspondence to the opcode. The predetermined instruction may be one indirect branch instruction among a plurality of instructions to be processed in the bytecode processing device 100 to process the bytecode. That is, the BTB update unit 150 may match the calculated target address and the opcode and store it only when executing a specific indirect branch instruction. For example, a predetermined indirect branch instruction may be an instruction that searches the BTB 105 and branches to the target address based on the found result.

The BTB update unit 150 may select a tag value to be stored in correspondence to the target address calculated based on the tag value selected in the BTB search unit 130. When the BTB 105 is searched using the opcode as the tag value, the BTB update unit 150 may store the opcode in correspondence to the calculated target address. When the BTB 105 is searched using the PC as the tag value, the BTB update unit 150 may store the PC in correspondence to the calculated target address.

When an example of the BTB update unit 150 is described with reference to FIG. 5, the BTB update unit 150 may include a comparator 151 and a multiplexer 152. The comparator 151 determines whether or not the value of the branch PC register 104 and the fetched PC are the same. When the value of the branch PC register 104 is equal to the fetched PC, the value of the opcode register 103 of the multiplexer 152 is outputted as an output value. The outputted opcode of the opcode register 103 is stored in the branch target buffer 105 together with the calculated target address. When the value of the branch PC register 104 is different from the fetched PC, the fetched PC is outputted as an output value of the multiplexer 152. The outputted PC is stored together with the target address calculated in the branch target buffer 105. The PC compared with the value of the branch PC register 104 in the BTB update unit 150 is identical to the value of the PC register 101 in FIG. 4.

For example, as shown in FIG. 5, if the value of the branch PC register 104 is equal to the PC, the opcode (e.g., opcode[LOAD]) is outputted as the output value of the multiplexer 152 and the opcode (e.g., opcode[LOAD]) and the target address (e.g., address[LOAD]) may be stored in the second buffer b2 of the BTB 105. At this time, the bit value of the valid bit field V of the second buffer b2 may be set to "1", and the bit value of the opcode bit field J may be set to "1".

In the case that the tag address corresponding to the target address is stored in the BTB 105, when processing a new bytecode having the same tag value, the bytecode processing device 100 may perform a new bytecode operation using the updated target address. For example, if the opcode of a new bytecode is identical to the updated tag value, the bytecode processing device 100 may predict a target address for performing a new bytecode operation from the updated target address extracted by the BTB search unit 130. Thus, the bytecode decode and the target address calculation process for performing a new bytecode operation may be omitted.

In an embodiment, when a bytecode including a new opcode is fetched in a dispatch loop, a new target address for performing operations with the new opcode may be stored in the BTB 105. If a loop is repeated and a bytecode including the same opcode is fetched, the bytecode processing device 100 may branch to the target address stored in the BTB 105 and process the bytecode without updating the BTB 105.

The bytecode execution unit 160 performs an operation of the bytecode fetched from the bytecode fetch unit 110. The bytecode execution unit 160 may branch to the target address extracted from the BTB search unit 130 to perform the fetched bytecode operation. In addition, the bytecode execution unit 160 may branch to the target address calculated in the bytecode decode unit 140 to perform the fetched bytecode operation. The bytecode execution unit 160 may store the execution result obtained by performing the bytecode operation in the external memory device.

Figure 6:
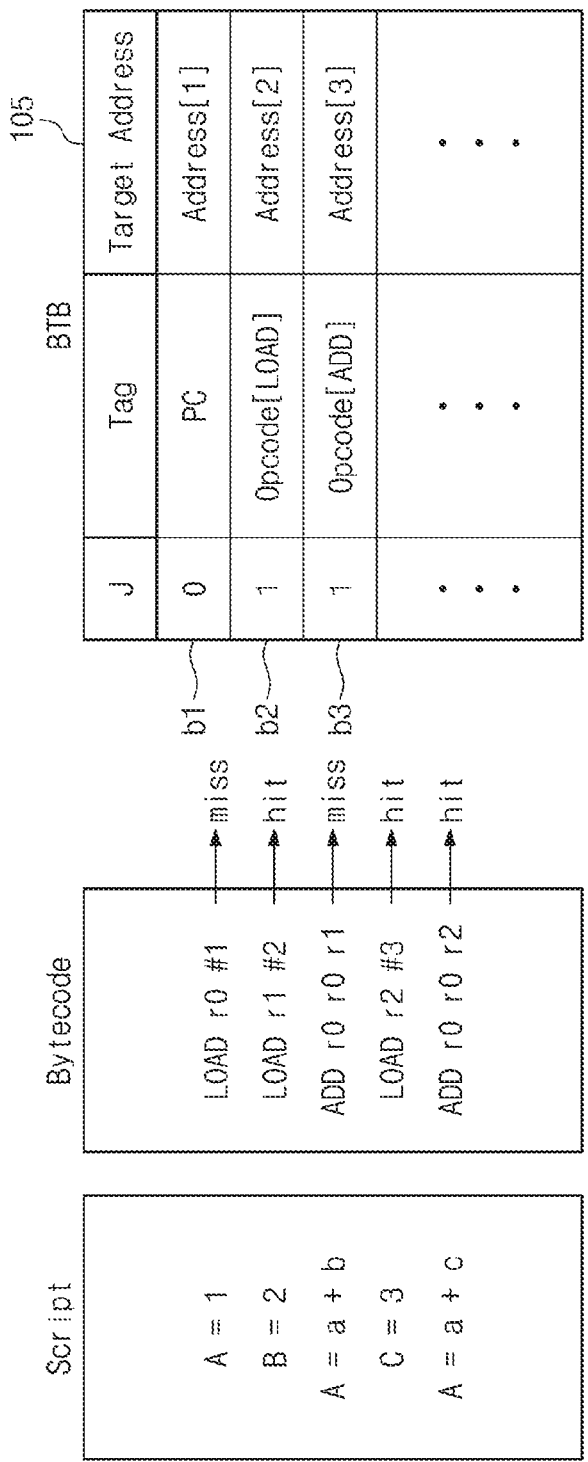
FIG. 6 is a diagram illustrating an example in which a bytecode is processed by the bytecode processing device of FIG. 2.

FIG. 6 is a diagram illustrating an example in which a bytecode is processed by the bytecode processing device of FIG. 2. Referring to FIG. 6, FIG. 6 shows a script written in a script language, a bytecode converted by a interpreter, and a BTB 105. The bytecode of FIG. 6 may include an opcode and an operand (OR). Before executing the bytecode, it is assumed that the BTB 105 includes only a PC and data on a target address (e.g., address[1]) corresponding thereto in the first buffer b1. However, such an assumption is intended to illustrate the embodiment of the inventive concept easily, and the scope of the inventive concept is not limited thereto.

First, the bytecode fetch unit 110 fetches the first bytecode (e.g., LOAD r0 #1). The opcode extraction unit 120 extracts opcode (LOAD) of the first bytecode (e.g., LOAD r0 #1). The BTB search unit 130 searches the BTB 105 using opcode (LOAD) as the tag value. If the same opcode is missed in the BTB 105, the bytecode decode unit 140 decodes the first bytecode (e.g., LOAD r0 #1) to calculate the target address (e.g., address[2]). The BTB update unit 150 may match the calculated target address (e.g., address [2]) and opcode (LOAD) of the first bytecode (e.g., LOAD r0 #1) and store matched data in the second buffer b2 of the BTB 105. The bytecode execution unit 160 branches to the calculated target address (e.g., address[2]) to perform an operation for storing "1" in the "r0" register (that is, an operation corresponding to the first bytecode (e.g., LOAD r0 #1)).

Next, the bytecode fetch unit 110 fetches the second bytecode (e.g., LOAD r1 #2). The opcode extraction unit 120 extracts opcode (LOAD) of the second bytecode (e.g., LOAD r1 #2). The BTB search unit 130 searches the BTB 105 using opcode (LOAD) as the tag value. At this time, opcode (LOAD) will be stored in the tag field of the second buffer b2 (hit). Accordingly, the BTB search unit 130 extracts the target address (e.g., address[2]) corresponding to the found tag field Tag stored in the second buffer b2. The bytecode execution unit 160 branches to the extracted target address (e.g., address[2]) to perform an operation for storing "2" in the "r1" register (that is, an operation corresponding to the second bytecode (e.g., LOAD r1 #2)).

Thus, if the bytecode processing device 100 processes the second bytecode (e.g., LOAD r1 #2) including the same opcode (or a previously processed opcode) (i.e., a hit), the operations of the bytecode decode unit 140 and the BTB update unit 150 may be omitted, so that the processing time of the second bytecode (e.g., LOAD r1 #2) may be improved.

Next, the bytecode fetch unit 110 fetches the third bytecode (e.g., ADD r0 r0 r1). Since opcode (ADD) of the third bytecode (ADD r0 #1) is a new opcode, it is processed in the same process as the processing process of the first bytecode (i.e., the process of the "miss" situation). The BTB update unit 150 stores the opcode (ADD) and the target address (e.g., address[3]) of the third bytecode (e.g., ADD r0 r0 r1) in the third buffer b3 of the BTB 105, and the bytecode execution unit 160 branches to the calculated target address (e.g., address[3]) and performs an operation for storing a value obtained by adding the "r0" register value and the "r1" register value in the "r0" register (i.e., an operation corresponding to the third bytecode (e.g., ADD r0 r0 r1)).

Similarly, the fourth bytecode (e.g., LOAD r2 #3) and the fifth bytecode (e.g., ADD r0 r0 r2) may be processed through a process (i.e., the process of the "hit" situation) similar to the processing process of the second bytecode (e.g., LOAD r1 #2).

Accordingly, the bytecode processing device 100 according to an embodiment of the inventive concept may shorten the bytecode processing time by predicting the target address using the opcode of the bytecode. In addition, since the bytecode processing device 100 predicts the target address using the opcode, prediction accuracy may be improved.

FIG. 7 is a diagram illustrating another example of a BTB according to an embodiment of the inventive concept. Referring to FIG. 7, the BTB 105a includes P, B, V, J, Tag, and Target Address. Since V, J, Tag, and Target Address are described with reference to FIGS. 4 and 5, detailed description thereof will be omitted.

The BTB 105a further includes a program ID field P and a branch ID field B as compared to the BTB 105 of FIGS. 4 and 5. The program ID field P includes a program ID value. When the bytecode processing device 100 performs multitasking to execute a plurality of programs, the program ID value may be used to identify a program to be executed. The target address corresponding to the opcode stored in the BTB 105a may be distinguished by the program ID field P in the process of executing a plurality of programs.

The branch ID field B includes a branch ID value. If the bytecode processing device 100 processes several dispatch loops in one program, the branch ID value may be used to distinguish the dispatch loop being processed. The target address corresponding to the opcode stored in the BTB 105*a* may be distinguished by the branch ID field B in the process of processing a plurality of dispatch loops.

For example, as shown in FIG. 7, when the program ID field P of the first buffer b1 includes the first program ID P[1] and the program ID field P of the second buffer b2 includes the second program ID P[2], each of the data stored in the first buffer b1 and the second buffer b2 may be data stored in an execution process of a different program. Since the same second program ID P[2] is stored in the program ID field P of the second buffer b2 and the program ID field P of the third buffer b3, the respective data stored in the second buffer b2 and the third buffer b3 may be data stored during the execution process of the same program. Since the first branch ID B[1] is stored in the branch ID field B of the second buffer b2 and the second branch ID B[2] is stored in the branch ID field B of the third buffer b3, the respective data stored in the second buffer b2 and the third buffer b3 may be data stored during the execution process of different dispatch loops among the same program.

The BTB 105 according to an embodiment of the inventive concept may limit the number of storing buffers using the opcode as a tag value. In an embodiment, the BTB 105 may limit the number of buffers that matches the opcode and the target address and stores matched data within a predetermined number or less. For example, the predetermined number may be a value that the number of buffers using an opcode as a tag value is smaller than the number of buffers using a PC as a tag value. Since the size of the BTB 105 is limited, the number of buffers using the PC as the tag value may be secured by limiting the number of buffers using the opcode as the tag value. The bytecode processing device 100 may more efficiently process the instruction for predicting the target address using the PC as the tag value by limiting the number of buffers using the opcode as the tag value.

Figure 8:
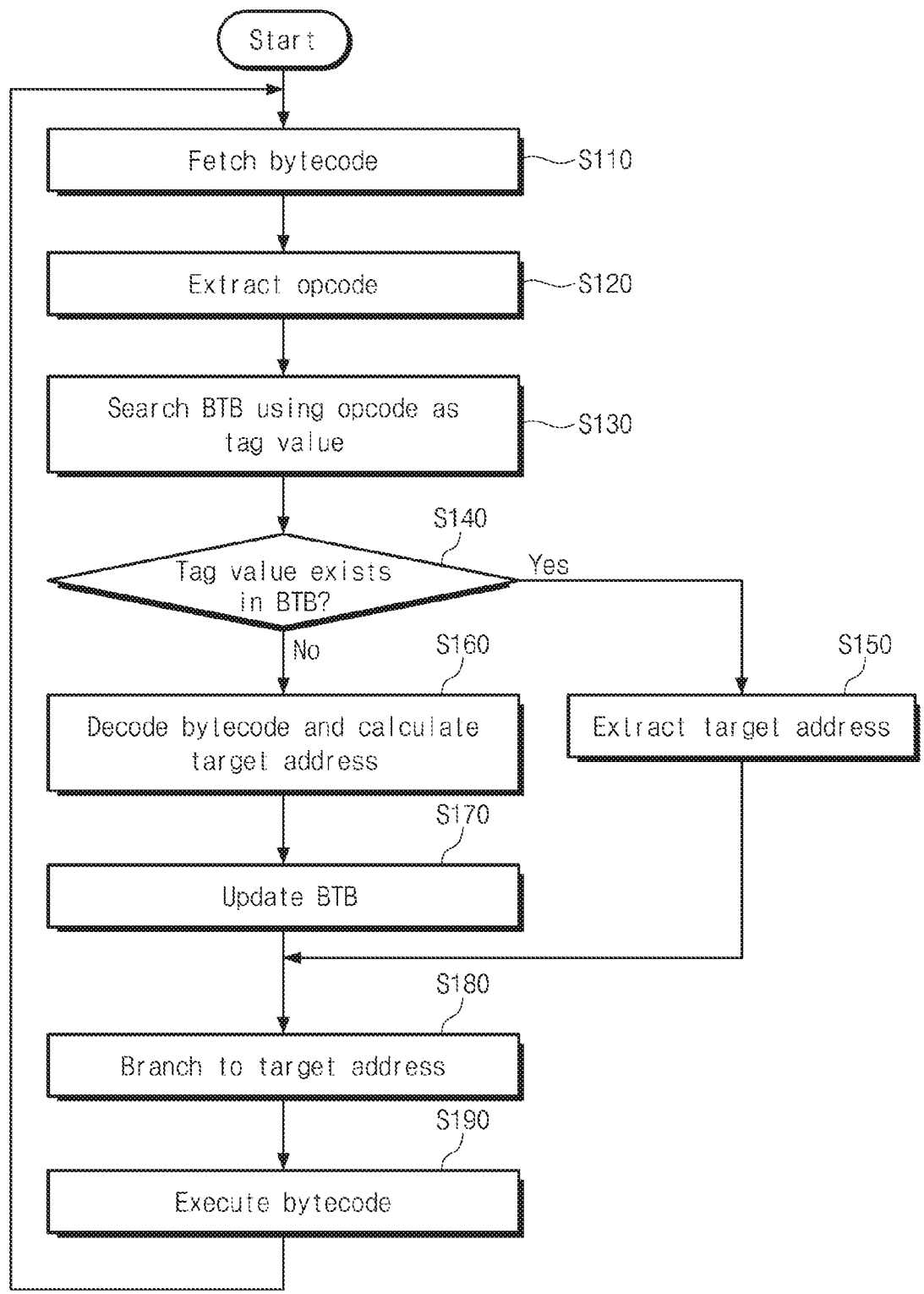
FIG. 8 is a flowchart showing a bytecode processing method of a bytecode processing device according to an embodiment of an inventive concept.

Hereinafter, a bytecode processing method according to an embodiment of an inventive concept will be described with reference to FIG. 8. FIG. 8 is a flowchart showing a bytecode processing method of a bytecode processing device according to an embodiment of an inventive concept.

Referring to FIGS. 2 and 8, in operation S110, the bytecode processing device 100 fetches a bytecode. For example, the bytecode fetch unit 110 of the bytecode processing device 100 may fetch the bytecode from the execution result of any instruction.

In operation S120, the bytecode processing device 100 extracts the opcode of the fetched bytecode. For example, the opcode extraction unit 120 of the bytecode processing device 100 may extract the opcode from the fetched bytecode and store it in the opcode register 103. The opcode extraction unit 120 may extract the opcode based on the opcode length of the bytecode. In addition, the opcode extraction unit 120 extracts an opcode by performing an AND operation of data including a bit having a bit value of "1" and a bytecode based on a predetermined number.

In operation S130, the bytecode processing device 100 searches the BTB 105 using the extracted opcode as a tag value. For example, the BTB search unit 130 of the bytecode processing device 100 may perform a search to determine whether the opcode in the BTB 105 exists using the extracted opcode. Alternatively, the BTB search unit 130 may perform a search to determine whether there is the PC of an instruction being processed (or fetched) in the BTB 105 to process the bytecode.

For example, the BTB search unit 130 may store the PC of one indirect branch instruction in advance among a plurality of instructions for processing bytecode, and compare the PC of the fetched instruction with a previously stored PC to select a tag value for searching the BTB 105 from an opcode or a PC. As a more detailed example, if the previously stored PC and the PC of the fetched instruction are the same, the BTB search unit 130 may select the opcode as the tag value for searching the BTB 105. If the previously stored PC and the PC of the fetched instruction are different from each other, the BTB search unit 130 may select the PC as the tag value for searching the BTB 105.

In operation S140, the bytecode processing device 100 may determine whether a tag value exists in the BTB 105.

If the extracted opcode exists in the BTB 105, the BTB search unit 130 may extract the target address corresponding to the opcode in operation S150.

If the extracted opcode does not exist in the BTB 105, the bytecode processing device 100 decodes the bytecode in operation S160 to calculate the target address. For example, the bytecode decode unit 140 of the bytecode processing device 100 may decode the bytecode to calculate a target address. The bytecode decode unit 140 may determine whether or not the opcode of the bytecode is a valid opcode. If the opcode is valid, the bytecode decode unit 140 may calculate the target address on which the bytecode operation is to be performed.

In operation S170, the bytecode processing device 100 updates the BTB 105. For example, the BTB update unit 150 of the bytecode processing device 100 may update the BTB 105 using the calculated target address. The BTB update unit 150 may match the extracted opcode and the calculated target address and store matched data in the BTB 105. In addition, the BTB update unit 150 may match the PC and the calculated target address and store matched data in the BTB 105. The PC stored in correspondence to the calculated target address is identical to the PC used as the tag value in operation S130.

The BTB update unit 150 may select from an opcode or a PC a tag value to be stored corresponding to the target address calculated based on the fetched instruction. For example, if the fetched instruction is a predetermined instruction, the BTB update unit 150 may store the calculated target address in correspondence to the opcode. The predetermined instruction may be one indirect branch instruction among a plurality of instructions to be processed in order to process the bytecode. That is, the BTB update unit 150 may select a tag value to be stored in correspondence to the target address calculated based on the tag value selected in operation S130. In an embodiment, the selecting of the tag value to be stored may be similar to the selecting of the tag value to be searched, which is described with reference to operation S130.

In operations S180 and S190, the bytecode processing device 100 branches to the target address to execute the bytecode. For example, the bytecode execution unit 160 of the bytecode processing device 100 may branch to the target address extracted in operation S150 or the target address calculated in operation S160 to perform the fetched bytecode operation. If there is a tag value searched in operation S140, the bytecode execution unit 160 may perform a fetched bytecode operation by branching to the target address extracted in operation S150. In addition, if there is no tag value searched in operation S140, the bytecode execution unit 160 may perform a fetched bytecode operation by branching to the target address calculated in operation S160.

The bytecode processing method shown in FIG. 8 may be an operation performed in one cycle of a dispatch loop. Therefore, if the dispatch loop is repeated, the processing method of FIG. 8 may also be repeated so that the bytecode may be processed.

Since the bytecode processing method according to an embodiment of the inventive concept predicts a target address using the opcode of a bytecode, the accuracy of the branch prediction may be improved. Also, since the bytecode processing method according to an embodiment of the inventive concept processes a bytecode using a pre-stored target address, it is possible to omit the operation of calculating the target address by decoding the bytecode. Thus, the bytecode processing speed may be improved.

FIG. 9 is a diagram showing an example of implementing a bytecode processing method by an alpha assembly code according to an embodiment of the inventive concept. FIG. 9 shows a machine code in which an embodiment of the inventive concept is applied to perform bytecode processing in a computer. That is, FIG. 9 shows an example of executing a plurality of instructions in the bytecode processing device 100 to process one bytecode. However, the scope of the inventive concept is not limited to this, and the inventive concept may be implemented in various types of machine code.

Referring to FIG. 9, a third line L3 shows an operation of fetching a bytecode to extract an opcode, and a seventh line L7 shows an operation of searching the BTB 105 using the opcode as a tag value. An eighth line L8 to a nineteenth line L19 show operations of decoding the bytecode to calculate a target address, and a twentieth line L20 shows an operation of updating the BTB 105 and branching to the target address.

A first code C1 to a third code C3 of FIG. 9 represent modified or added instructions among instructions for processing the bytecode. In the first code C1, a suffix .op for extracting and storing the opcode is added to an existing load instruction "lw". In the first code C1, by executing an instruction "lw.op", the fetched bytecode is stored in a register "s1" and the extracted opcode is stored in an opcode register 103. In the second code C2, by executing an instruction "bop", it is searched to determine whether there is the opcode in the BTB 105 by using the stored opcode as a tag value. When the opcode exists, the value of the PC register 101 is changed to the corresponding target address value. If no opcode exists, the instructions of the ninth line L9 to the twentieth line L20 are executed. In the third code C3, by executing an instruction "jru", the bytecode execution operation branches to the calculated target address "a5", and the calculated target address "a5" and the stored opcode are stored in the BTB 105 in correspondence to each other.

In the example of FIG. 9, whether to use the opcode as the tag value may be determined by an indirect branch instruction "bop". The PC of the indirect branch instruction "bop" previously stored in the branch PC register 104 is compared with the PC of the fetched instruction, and it may be determined whether to use the opcode as the tag value according to a comparison result. When the bytecode processing device 100 fetches the instruction of the seventh line L7, since the PC of the fetched instruction and the PC of the pre-stored indirect branch instruction "bop" are the same, the bytecode processing device 100 may search the BTB 105 with the opcode as the tag value. That is, the indirect branch instruction "bop" may be a predetermined indirect branch instruction.

Figure 10:
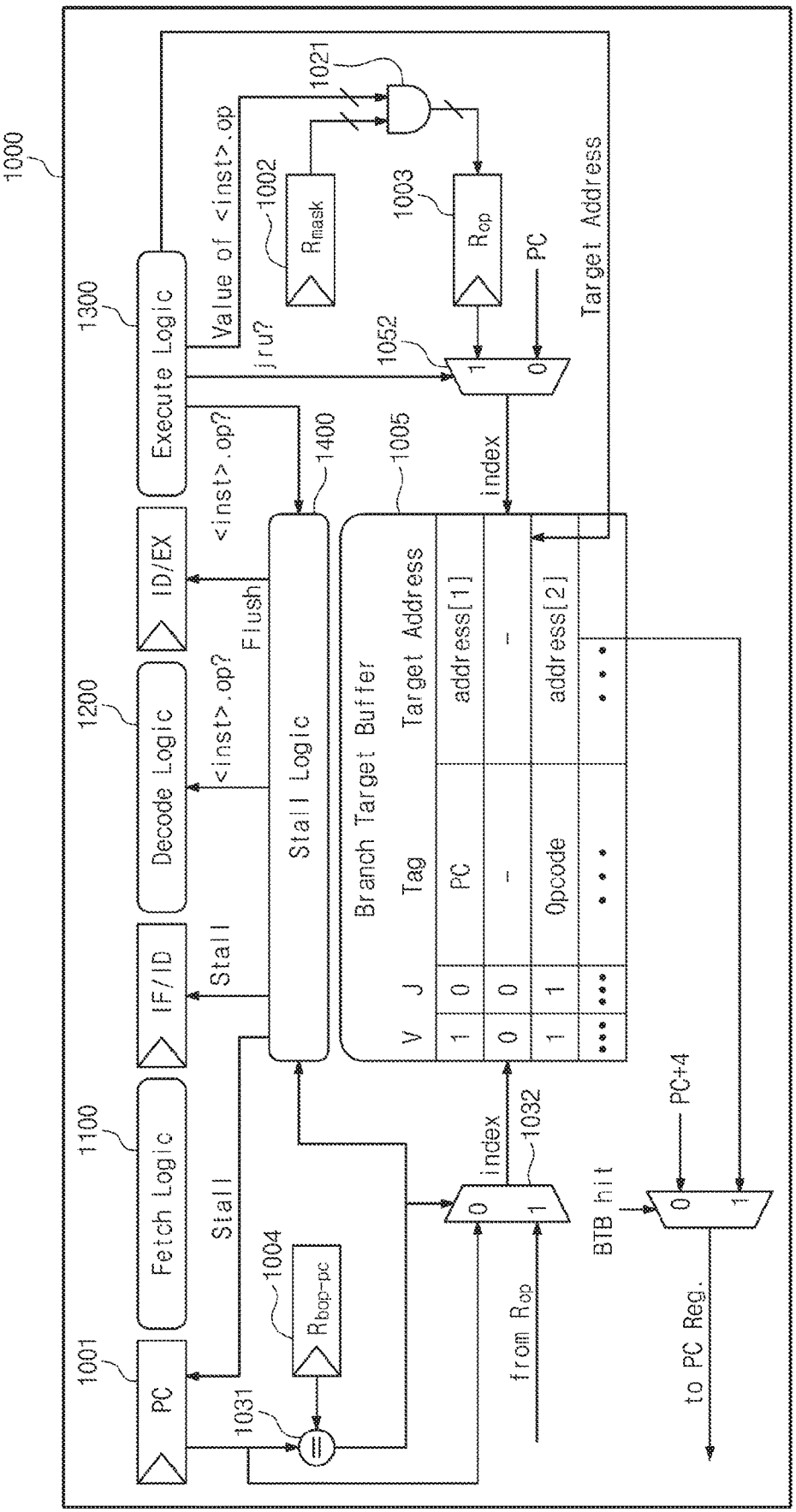
FIG. 10 is a pipeline structure diagram for processing a bytecode according to an embodiment of the inventive concept.

FIG. 10 is a pipeline structure diagram for processing a bytecode according to an embodiment of the inventive concept. Referring to FIGS. 9 and 10, a pipeline structure 1000 includes a PC register 1001, a mask register 1002, an opcode register 1003, a branch PC register 1004, a BTB 1005, a fetch logic 1100, a decode logic 1200, and an execute logic 1300. The fetch logic 1100, the decode logic 1200, and the execute logic 1300 may be logics for executing a machine language in hardware (e.g., a CPU). For example, it may be a logic for executing the instructions of the first code C1 to the third code C3 of FIG. 9. That is, the instruction "ldl.op" of the first code C1 may be executed through the fetch logic 1100, the decode logic 1200, and the execute logic 1300. In addition, the instruction "bop" of the second code C2 may be executed through the fetch logic 1100, the decode logic 1200, and the execute logic 1300. In addition, the instruction "jru" of the third code C3 may be executed through the fetch logic 1100, the decode logic 1200, and the execute logic 1300.

The pipeline structure diagram 1000 includes an AND logic circuit 1021. As the AND logic circuit 1021 performs an AND operation on the value of the mask register 1002 and the bytecode, an opcode may be extracted. The extracted opcode is stored in the opcode register 1003. For example, when the instruction "lw.op" of the first code C1 in FIG. 9 is executed, the opcode may be extracted.

The pipeline structure diagram 1000 includes a comparator 1031 and a multiplexer 1032. The comparator 1031 may determine whether the values stored in the PC register 1001 and the branch PC register 1004 are the same. If the value of the PC register 1001 is equal to the value of the branch PC register 1004, the fetched instruction may be a predetermined indirect branch instruction. At this time, the instruction "bop" of the second code C2 in FIG. 9 may be executed. According to the instruction "bop" of the second code C2, the BTB 1005 may be searched using the extracted opcode as the tag value. The multiplexer 1032 may output the opcode as an output value when the instruction "bop" of the second code C2 is executed.

The pipeline structure diagram 1000 includes a multiplexer 1052. The multiplexer 1052 may output the opcode as an output value when the instruction "jru" of the third code C3 is executed. The outputted opcode may be stored in the BTB 1005 with the corresponding calculated target address.

The BTB 1005 stores the target address using the PC or opcode as the tag value. If the BTB 1005 is searched and a corresponding tag value exists (i.e., BTB hit), the extracted target address may be stored in the PC register 1001. If the BTB 1005 is searched and a corresponding tag value does not exist, the PC of the next instruction may be stored in the PC register 1001. For example, when the PC register 1001 is "32" bits, "PC+4" may be stored in the PC register 1001.

In addition, the pipeline structure 1000 may further include a delay logic 1400. The delay logic 1400 delays operations being processed on the pipeline. In an embodiment, if the instruction "bop" for searching the BTB 1005 is fetched using the opcode as the tag value before the opcode is extracted, the delay logic 1400 may delay the pipeline in which the instruction "bop" is processed. Accordingly, the instruction "bop" may be executed after the opcode is extracted.

The bytecode processing device 100 according to an embodiment of the inventive concept may be included in various virtual machines (e.g., a simulator, a decoder, and so on), a CPU, an accelerator, and so on, which process a bytecode including an opcode. A virtual machine, a CPU, and an accelerator to which the bytecode processing device 100 according to an embodiment of the inventive concept is applied may speed up the program execution by improving the processing performance of the bytecode.

The terms logic, unit, block, etc., as used herein, may be embodied in any suitable software, hardware, or combination thereof. The hardware may include a processor, a controller, a server, an interface, a signal processor, and various integrated circuits and combinations thereof. The software may include a program stored in memory or on a storage device and executed by the hardware.

According to an embodiment of the inventive concept, it is possible to provide a bytecode processing device and an operation method thereof, which improve the prediction probability of an indirect branch in a dispatch loop and shorten the processing time of repeated bytecode. Accordingly, it is possible to provide a bytecode processing device and an operation method thereof, which improve the execution speed of a program written in a programming language.

Although the exemplary embodiments of the inventive concept have been described, it is understood that the inventive concept should not be limited to these exemplary embodiments but various changes and modifications can be made by one ordinary skilled in the art within the spirit and scope of the inventive concept as hereinafter claimed.

What is claimed is:

1. A bytecode processing device comprising:
    a branch target buffer including a tag field, a target address field corresponding to the tag field, and an operation code bit field for representing whether a value stored in the tag field is an operation code;
    a bytecode fetch unit configured to fetch a bytecode including an operation code;
    an operation code extraction unit configured to extract the operation code from the bytecode;
    a branch target buffer search unit configured to perform a search to determine whether the extracted operation code exists in the tag field of the branch target buffer, and if the operation code exists in the tag field, extract a target address corresponding to the operation code from the target address field; and
    a bytecode execution unit configured to execute the bytecode by branching to the extracted target address.

2. The device of claim 1, further comprising a mask register configured to store data including at least one bit having a bit value of 1,
    wherein the operation code extraction unit extracts the operation code by performing an AND operation on the data stored in the mask register and the bytecode.

3. The device of claim 1, further comprising:
    a program counter register configured to store an address of an instruction to be fetched among a plurality of instructions processed to process the bytecode; and
    at least one branch program counter register configured to store an address of a predetermined indirect branch instruction,
    wherein if the address of at least one predetermined indirect branch instruction stored in the at least one branch program counter register is identical to the address of the instruction to be fetched, the branch target buffer search unit performs a search to determine whether the operation code exists in the tag field.

4. The device of claim 1, further comprising a branch target buffer update unit configured to, when the operation code does not exist in the tag field, calculate the target address by decoding the bytecode and store the calculated target address and the operation code in the branch target buffer.

5. The device of claim 1, wherein the branch target buffer further comprises a program ID field for distinguishing a program corresponding to a value of the tag field or a value of the target address field.

6. The device of claim 1, wherein the branch target buffer further comprises a branch ID field for distinguishing a dispatch loop corresponding to a value of the tag field or a value of the target address field.

7. The device of claim 1, wherein the number of buffers in the branch target buffer for storing the operation code and the target address is less than a predetermined number.

8. An operation method of a bytecode processing device comprising a branch target buffer including a tag field, a target address field corresponding to the tag field, and an operation code bit field for representing whether a value stored in the tag field is an operation code, the method comprising:
    fetching a bytecode including an operation code;
    extracting the operation code from the bytecode;
    performing a search to determine whether the extracted operation code exists in the tag field of the branch target buffer;
    extracting a target address corresponding to the operation code from the target address field if the operation code exists in the tag field; and
    executing the bytecode by branching to the extracted target address.

9. The method of claim 8, wherein the extracting of the operation code comprises extracting the operation code by performing an AND operation on data including at least one bit having a bit value of 1 and the bytecode.

10. The method of claim 8, wherein the searching of the branch target buffer comprises:
    determining whether an address of an instruction to be fetched among a plurality of instructions processed to process the bytecode is identical to an address of at least one predetermined indirect branch instruction; and
    if the address of the instruction to be fetched is identical to the address of at least one predetermined indirect branch instruction, searching the tag field by using the operation code.

11. The method of claim 8, further comprising, if the operation code does not exist in the tag field, calculating the target address by decoding the bytecode; and storing the calculated target address and the operation code in the branch target buffer.

* * * * *